US008349970B2

(12) United States Patent
Faucher et al.

(10) Patent No.: US 8,349,970 B2
(45) Date of Patent: Jan. 8, 2013

(54) PHASE CHANGE COMPOSITION FOR PRINTING

(75) Inventors: Santiago Faucher, Oakville (CA); Stephan V. Drappel, Toronto (CA); Christopher A. Wagner, Etobicoke (CA)

(73) Assignee: Xerox Corporation, Norwalk, CT (US)

( * ) Notice: Subject to any disclaimer, the term of this patent is extended or adjusted under 35 U.S.C. 154(b) by 83 days.

(21) Appl. No.: 12/954,117

(22) Filed: Nov. 24, 2010

(65) Prior Publication Data

US 2012/0128881 A1    May 24, 2012

(51) Int. Cl.
*C08F 283/02* (2006.01)
(52) U.S. Cl. .................... 525/412; 106/31.13; 106/31.6; 106/31.61; 525/165; 525/186; 525/445
(58) Field of Classification Search ............... 106/31.13, 106/31.6, 31.61; 525/445, 412, 165, 186
See application file for complete search history.

(56) References Cited

U.S. PATENT DOCUMENTS

| 7,084,189 B2 | 8/2006 | Banning et al. |
| 2006/0132570 A1* | 6/2006 | Odell et al. ................... 347/102 |
| 2009/0195572 A1 | 8/2009 | Kovacs et al. |
| 2010/0086683 A1* | 4/2010 | Birau et al. ................... 427/256 |

OTHER PUBLICATIONS

U.S. Appl. No. 12/629,583, filed Dec. 2, 2009 to Faucher.

* cited by examiner

*Primary Examiner* — David W Wu
*Assistant Examiner* — Robert Jones, Jr.
(74) *Attorney, Agent, or Firm* — Oliff & Berridge, PLC

(57) ABSTRACT

A phase change composition including at least one crystalline polyester and at least one acrylate monomer. Examples of suitable crystalline polyesters include aliphatic crystalline polyesters and polylactones. A method of making the phase change composition, and a method for applying the phase change composition to a substrate.

20 Claims, No Drawings

PHASE CHANGE COMPOSITION FOR PRINTING

TECHNICAL FIELD

This disclosure relates to phase change compositions for printing or protecting images on a substrate, and to a method of making and using such components.

BACKGROUND

Phase change compositions, such as inks and overcoats, have been developed to allow robust printing on a wide variety of materials. The materials include non-porous substrates, such as glossy paper, plastics, aluminum foil, etc., and paper-based substrates. The robust printing or coating on these materials is accomplished by a phase change of the printing composition upon cooling, where the composition changes from low viscosity to high viscosity.

The main component of known phase change compositions is an amide-unilin gellant. Amide-unilin gellants are manufactured from raw materials with high levels of impurities and high viscosities, which makes purification difficult. Once the raw materials are purified and the gellant is manufactured, the gellant is blended into an acrylate monomer, with other additives such as colorants and the like, to form the final phase change composition. The multi-step process, including the difficult purification step, adds greatly to the cost of manufacturing the gellant, making the phase change composition more expensive for the customer.

A new mechanism or chemistry that would simplify the manufacturing process of the phase change composition would therefore be desirable.

SUMMARY

The present disclosure in embodiments addresses these various needs and problems by providing a phase change composition comprising a crystalline polyester and at least one monomer. Examples of suitable crystalline polyesters include aliphatic crystalline polyesters and polylactones. Embodiments of the phase change composition provide a viable ink that has a viscosity suitable for jetting in a print fixture and may also be made cross-linkable if a photoinitiator is added to the polyester. Embodiments may also comprise colorants and other additives Compared to the conventional gellants used in known phase change compositions, embodiments of the phase change composition offer a simple way to achieve the functionality currently achieved with the current class of amide-unillin-gel inks, consist of thermally and chromologically stable materials, are scaleable, and are of low cost to the consumer.

EMBODIMENTS

Herein are disclosed phase change compositions, such as inks or overcoats. Embodiments of the phase change composition comprise a crystalline polyester and a monomer, wherein the crystalline polyester is dissolved in the monomer. The phase change composition may be produced in one direct step, thus eliminating the need to manufacture or purify a gellant separately. The phase change composition may additionally comprise photoinitiators, stabilizers, colorants, or the like to form inks and overcoats.

As used herein, the term "viscosity" refers to a complex viscosity, which is the typical measurement provided by a mechanical rheometer capable of subjecting a sample to a steady shear strain or a small amplitude sinusoidal deformation. In this type of instrument, the shear strain is applied by the operator to the motor and the sample deformation (torque) is measured by the transducer. Alternatively, a controlled-stress instrument, where the shear stress is applied and the resultant strain is measured, may be used. Such a rheometer provides a periodic measurement of viscosity at various plate rotation frequencies, $\omega$, rather than the transient measurement of, for instance, a capillary viscometer. The reciprocating plate rheometer is able to measure both the in phase and out of phase fluid response to stress or displacement. The complex viscosity, $\eta^*$, is defined as $\eta^*=\eta'-i\eta''$; where $\eta'=G''/\omega$, $\eta''=G'/\omega$ and i is $\sqrt{-1}$. Alternatively, a viscometer that can measure only the transient measurement of for instance, a capillary or shear viscosity can also be used.

As used herein, the term "phase change" refers to a composition forming a solid-like gel at temperatures below the gel point of the composition, for example, below the temperature at which the composition is jetted. For example, embodiments range in viscosity from about $10^3$ to about $10^7$ cps, such as from about $10^{3.5}$ to about $10^{6.5}$ cps in the solid-like phase at room temperature. These viscosities are obtained using the cone and plate technique, at a shear rate of 1 $s^{-1}$. The gel phase typically comprises a solid-like phase and a liquid phase in coexistence, wherein the solid-like phase forms a three-dimensional network structure throughout the liquid phase and prevents the liquid phase from flowing at a macroscopic level.

Embodiments of the phase change composition exhibit a thermally reversible transition between the gel state and the liquid state when the temperature is varied above or below the gel point of those embodiments. This temperature is generally referred to as a sol-gel temperature. This cycle of gel reformation can be repeated a number of times, since the gel is formed by physical, non-covalent interactions between the crystalline polyester molecules, such as hydrogen bonding, aromatic interactions, ionic bonding, coordination bonding, London dispersion interactions, or the like.

The range of temperatures at which embodiments of the phase change composition are in gel state is, for example, from about 15° C. to about 40° C., such as from about 10° C. to about 35° C., such as from about 15° C. to about 30° C. For example, the composition has a viscosity of about $10^4$ cps at a temperature of about 40° C. The gel liquefies at temperatures of from about 40° C. to about 90° C., such as from about 40° C. to about 85° C., such as from 40 to about 60. When transitioning from the liquid state at a jetting temperature to the gel state, the composition undergoes a significant viscosity increase. The viscosity increase is a three orders of magnitude increase in viscosity.

Embodiments of the phase change composition may be jetted directly onto a substrate and, when the phase change composition is an overcoat, the phase change composition may then be leveled by contact or non-contact leveling, for example leveling as disclosed in U.S. patent application Ser. No. 12/023,979, filed Jan. 31, 2008, to Kovacs et al.

Crystalline Polyesters.

Embodiments of the phase change composition comprise a crystalline polyester. As used herein, the term "polyester" refers to any of the various synthetic polymers produced by the reaction of dibasic acids with hydric alcohols. The term "crystalline" refers to compounds having constituent atoms, molecules, or ions that are arranged in an orderly repeating pattern extending in all three special dimensions. Crystalline compounds may exhibit a clear endothermic peak rather than a stepwise variation in the quantity of heat absorption when measured using differential scanning calorimetry ("DSC").

Suitable crystalline polyesters include aliphatic crystalline polyesters, polylactones, and the like. The term "aliphatic" refers to hydrocarbons that do not contain aromatic rings and are characterized by straight-chain arrangement of constituent carbon atoms. Aliphatic hydrocarbons include, for example, alkanes (e.g., paraffin hydrocarbons), alkenes or alkadienes (e.g., olefins such as ethylene), and alkynes (e.g., acetylene). Examples of suitable aliphatic crystalline polyesters include, for example, copoly(2,2-dimethylpropane-1,3-diol-decanoate)-copoly(nonylene-decanoate), which comprises the following monomeric components:

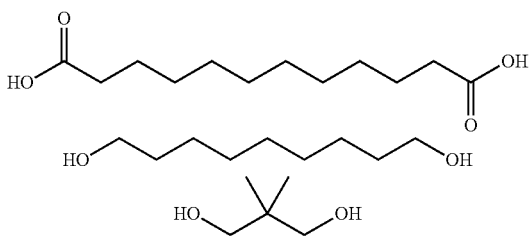

In embodiments, the polyester resin may be formed by reacting a diol with a diacid in the presence of an optional catalyst. For forming a crystalline polyester, suitable organic diols include aliphatic diols with from about 2 to about 36 carbon atoms, such as 1,2-ethanedial, 1,3-propanediol, 1,4-butanediol, 1,5-pentanediol, 2,2-dimethylpropane-1,3-diol, 1,6-hexanediol, 1,7-heptanediol, 1,8-octanediol, 1,9-nonanediol, 1,10-decanediol, 1,12-dodecanediol and the like including their structural isomers. The aliphatic diol may be, for example, selected in an amount of from about 40 to about 60 mole percent, in embodiments from about 42 to about 55 mole percent, in embodiments from about 45 to about 53 mole percent, and a second diol can be selected in an amount of from about 0 to about 10 mole percent, in embodiments from about 1 to about 4 mole percent of the resin.

Examples of organic diacids or diesters including vinyl diacids or vinyl diesters selected for the preparation of the crystalline resins include oxalic acid, succinic acid, glutaric acid, adipic acid, suberic acid, azelaic acid, sebacic acid, fumaric acid, dimethyl fumarate, dimethyl itaconate, cis, 1,4-diacetoxy-2-butene, diethyl fumarate, diethyl maleate, malonic acid and mesaconic acid, a diester or anhydride thereof. The organic diacid may be selected in an amount of, for example, in embodiments from about 40 to about 60 mole percent, in embodiments from about 42 to about 52 mole percent, in embodiments from about 45 to about 50 mole percent, and a second diacid can be selected in an amount of from about 0 to about 10 mole percent of the resin.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), copoly(2,2-dimethylpropane-1,3-diol-decanoate)-copoly(nonylene-decanoate), poly(octylene-adipate). Examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinimide), and poly(propylene-sebecamide). Examples of polyimides include poly(ethylene-adipimide), polypropylene-adipimide), poly(butylene-adipimide), poly(pentylene-adipimide), poly(hexylene-adipimide), poly(octylene-adipimide), poly(ethylene-succinimide), polypropylene-succinimide), and poly(butylene-succinimide).

Examples of suitable polycondensation catalyst for the crystalline polyesters include tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, or mixtures thereof; and which catalysts are selected in amounts of, for example, from about 0.01 mole percent to about 5 mole percent based on the starting diacid or diester used to generate the polyester resin.

The term "polylactone" refers to linear polyesters made through the enzymatic polymerization of cyclic lactone monomers as illustrated below:

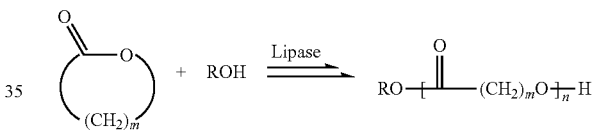

Polylactones are formed through enzymatic polymerization of cyclic or non-cyclic esters. In embodiments, the reaction solution includes an ester monomer. The ester monomer may be a cyclic ester monomer. Any appropriate cyclic ester monomer may be used in the enzymatic polymerization, such as a cyclic ester having from 5 to 16 carbon atoms, such as 6 to 15 carbon atoms, 7 to 12 carbon atoms, or 8 to 10 carbon atoms. The cyclic ester monomer may be a lactone, lactide and macrolide, cyclic carbonate, cyclic phosphate, cyclic depsipeptide or oxirane. Illustrative examples of appropriate cyclic ester monomers include lactones, such as oxacycloheptadec-10-en-2-one (available as AMBRETTOLIDE, from Penta Manufacturing Co.), omega-pentadecalactone (available as EXALTOLIDE, from Penta Manufacturing Co.), pentadecalactone, 11/12-pentadecen-15-olide (also known as pentadecenlactone), hexadecenlactone and caprolactone. Other suitable ester monomers include β-propiolactone, β-butyrolactone, propylmalolactonate, 2-methylene-4-oxa-12-dodecanolide, poly(butadiene-b-pentadecalactone, poly(butadiene-b-ε-CL), ε-caprolactone, (R) and (S)-3-methyl-4-oxa-6-hexanolide, 1,3-dioxane-2-one, 1,4-dioxane-2-one, 3(S)-isopropylmorpholine-2,5-dione, Morpholine-2,5-dione derivatives, trimethylene carbonate, 1-methyl trimethylene carbonate, 8-octanolide, δ-Decalactone, 12-Dodecanolide, α-Methylene macrolides, and α-Methylene-δ-valerolactone.

In embodiments, suitable polylactones include, for example, poly(pentadecalactone), poly(pentadecenlactone), poly(hexadecenlactone), poly(hexadecen-7-olide), polycaprolactone, polydodecalactone, poly(pentadecalactone) co-pentadecenlactone, poly(pentadecalactone) co-hexadecenlactone, combinations thereof, and the like.

The crystalline resins, which are available from a number of sources, can possess various melting points of, for example, from about 30° C. to about 120° C., such as from about 50° C. to about 90° C. The crystalline resin may have, for example, a number average molecular weight (Mn), as measured by gel permeation chromatography (GPC) of, for example, from about 1,000 to about 50,000, and preferably from about 2,000 to about 25,000. The weight average molecular weight (Mw) of the resin may be, for example, from about 2,000 to about 100,000, and preferably from about 3,000 to about 80,000, as determined by GPC using polystyrene standards. The molecular weight distribution (Mw/Mn) of the crystalline resin is, for example, from about 2 to about 6, and more specifically, from about 2 to about 4.

Monomers.

The ink includes one or more co-monomers. In embodiments, the co-monomers may or may not be radiation curable monomers.

Examples of the at least one curable monomer of the composition include propoxylated neopentyl glycol diacrylate (such as SR-9003 from Sartomer), diethylene glycol diacrylate, triethylene glycol diacrylate, hexanediol diacrylate, dipropyleneglycol diacrylate, tripropylene glycol diacrylate, alkoxylated neopentyl glycol diacrylate, isodecyl acrylate, tridecyl acrylate, isobornyl acrylate, isobornyl (meth)acrylate, propoxylated trimethylolpropane triacrylate, ethoxylated trimethylolpropane triacrylate, di-trimethylolpropane tetraacrylate, dipentaerythritol pentaacrylate, ethoxylated pentaerythritol tetraacrylate, propoxylated glycerol triacrylate, isobornyl methacrylate, lauryl acrylate, lauryl methacrylate, neopentyl glycol propoxylate methylether monoacrylate, isodecylmethacrylate, caprolactone acrylate, 2-phenoxyethyl acrylate, isooctylacrylate, isooctylmethacrylate, mixtures thereof and the like. As relatively non-polar monomers, mention may be made of isodecyl(meth)acrylate, caprolactone acrylate, 2-phenoxyethyl acrylate, isooctyl (meth)acrylate, and butyl acrylate. In addition, multifunctional acrylate monomers/oligomers may be used not only as reactive diluents, but also as materials that can increase the cross-link density of the cured image, thereby enhancing the toughness of the cured images.

The term "curable monomer" is also intended to encompass curable oligomers, which may also be used in the ink composition. Examples of suitable radiation curable oligomers that may be used in the compositions have a low viscosity, for example, from about 50 cps to about 10,000 cps, such as from about 75 cps to about 7,500 cps or from about 100 cps to about 5,000 cps. Examples of such oligomers may include CN549, CN131, CN131B, CN2285, CN 3100, CN3105, CN132, CN133, CN 132, available from Sartomer Company, Inc., Exeter, Pa., Ebecryl 140, Ebecryl 1140, Ebecryl 40, Ebecryl 3200, Ebecryl 3201, Ebecryl 3212, available from Cytec Industries Inc, Smyrna Ga., PHOTOMER 3660, PHOTOMER 5006F, PHOTOMER 5429, PHOTOMER 5429F, available from Cognis Corporation, Cincinnati, Ohio, LAROMER PO 33F, LAROMER PO 43F, LAROMER PO 94F, LAROMER UO 35D, LAROMER PA 9039V, LAROMER PO 9026V, LAROMER 8996, LAROMER 8765, LAROMER 8986, available from BASF Corporation, Florham Park, N.J., and the like. As multifunctional acrylates and methacrylates, mention may also be made of pentaerythritol tetra(meth)acrylate, 1,2 ethylene glycol di(meth)acrylate, 1,6 hexanediol di(meth)acrylate, 1,12-dodecanol di(meth)acrylate, tris(2-hydroxy ethyl) isocyanurate triacrylate, propoxylated neopentyl glycol diacrylate, hexanediol diacrylate, tripropylene glycol diacrylate, dipropylene glycol diacrylate, amine-modified polyether acrylates (available as PO 83 F, LR 8869, and/or LR 8889 (all available from BASF Corporation)), trimethylolpropane triacrylate, glycerol propoxylate triacrylate, dipentaerythritol penta-/hexa-acrylate, ethoxylated pentaerythritol tetraacrylate (available from Sartomer Co. Inc. as SR 494), and the like.

In embodiments, the co-monomers may be chosen from short-chain alkyl glycol diacrylates or ether diacrylates, such as propoxylated neopentyl glycol diacrylate, and the non-fluorescent co-monomer may be chosen from acrylates having short-chain alkyl ester substituents, such as caprolactone acrylate, and the commercially available products CD536, CD 2777, CD585 and CD586 (available from Sartomer Co. Inc.).

The phase-change ink compositions of embodiments may include one or more monomers in an amount ranging from about 10% to about 80% by weight, such as from about 20% to about 70% by weight, or from about 30% to about 60% by weight, relative to the total weight of the ink vehicle.

Additives.

Photoinitiators. Embodiments may comprise at least one photoinitiator. The term "photoinitiator" refers to an additive that initiates curing, for example UV curing. Any photoinitiator that absorbs radiation, for example UV light radiation, to initiate curing of the curable components of the formulation may be used, although it is desirable if the photoinitiator does not substantially produce a yellow coloration upon cure.

Examples of free-radical photoinitiators that are suitable for use with compositions including acrylates include benzophenones, benzoin ethers, benzil ketals, α-hydroxyalkylphenones, and acylphosphine photoinitiators, such as sold under the trade designations of IRGACURE and DAROCUR from Ciba. Specific examples of suitable photoinitiators include 2,4,6-trimethylbenzoyldiphenylphosphine oxide (available as BASF LUCIRIN TPO); 2,4,6-trimethylbenzoylethoxyphenylphosphine oxide (available as BASF LUCIRIN TPO-L); bis(2,4,6-trimethylbenzoyl)-phenylphosphine oxide (available as Ciba IRGACURE 819) and other acyl phosphines; 2-methyl-1-(4-(methylthio)phenyl-2-(4-morphorlinyl)-1-propanone (available as Ciba IRGACURE 907) and 1-(4-(2-hydroxyethoxy)phenyl)-2-hydroxy-2-methylpropan-1-one (available as Ciba IRGACURE 2959); 2-hydroxy-1-(4-(4-(2-hydroxy-2-methylpropionyl)-benzyl)-phenyl)-2-methylpropan-1-one (available as Ciba IRGACURE 127); titanocenes; isopropylthioxanthone (ITX); 1-hydroxy-cyclohexylphenylketone; benzophenone; 2,4,6-trimethylbenzophenone; 4-methylbenzophenone; diphenyl-(2,4,6-trimethylbenzoyl) phosphine oxide; 2,4,6-trimethylbenzoylphenylphosphinic acid ethyl ester; oligo(2-hydroxy-2-methyl-1-(4-(1-methylvinyl)phenyl) propanone); 2-hydroxy-2-methyl-1-phenyl-1-propanone; benzyl-dimethylketal; and mixtures thereof.

An amine synergist, that is, co-initiators that donate a hydrogen atom to a photoinitiator and thereby form a radical species that initiates polymerization (amine synergists can also consume oxygen dissolved in the formulation—as oxygen inhibits free-radical polymerization its consumption increases the speed of polymerization), for example such as ethyl-4-dimethylaminobenzoate and 2-ethylhexyl-4-dimethylaminobenzoate, may also be included. This list is not exhaustive, and any known photoinitiator that initiates the free-radical reaction upon exposure to a desired wavelength of radiation, such as UV light, but does not become colored following irradiation, can be used without limitation.

The total amount of photoinitiator included in embodiments of the phase change composition may be, for example, from about 0% to about 15%, such as from about 0.5 to about 10%, by weight of the overprint varnish composition.

Embodiments of the phase change composition are typically cooled upon jetting to below the gel point of the composition in order to take advantage of its gelling properties. Upon cooling, the phase change composition may then be exposed to curing energy for curing of the composition. Upon exposure to a suitable source of curing energy, for example, ultraviolet light, electron beam energy, and the like, the photoinitiator absorbs the energy and sets into motion a reaction that converts the gel-like composition into a cured composition. The viscosity of the composition further increases upon exposure to the suitable source of curing energy, such that it hardens to a solid. The viscosity of the cured composition is not routinely measurable.

In the absence of photoinitiators, the phase change composition can contain functional groups that may polymerize as a result of exposure to e-beam radiation. This polymer network provides printed images with, for example, durability, thermal and light stability, and scratch and smear resistance. Thus, the cured composition is particularly well-suited for printing or coating on substrates subjected to heat and sunlight because the cured composition is protected from cracking and fading, provides image permanence, and allows for overwriting in the absence of smearing and beading.

Colorants. Embodiments of the phase change composition may also include colorants, such as pigment, dye, mixtures of pigment and dye, mixtures of pigments, mixtures of dyes, and the like. As the pigment colorant media, any suitable pigment may be used without limitation so long as the colorant is dispersible within the ink vehicle. Examples of suitable pigments include, but are not limited to, PALIOGEN Violet 5100 (BASF); PALIOGEN Violet 5890 (BASF); HELIOGEN Green L8730 (BASF); LITHOL Scarlet D3700 (BASF); Sunfast® Blue 15:4 (Sun Chemical 249-0592); HOSTAPERM Blue B2G-D (Clariant); Permanent Red P-F7RK; HOSTAPERM Violet BL (Clariant); LITHOL Scarlet 4440 (BASF); Bon Red C (Dominion Color Company); ORACET Pink RF (Ciba); PALIOGEN Red 3871 K (BASF); Sunfast® Blue 15:3 (Sun Chemical 249-1284); PALIOGEN Red 3340 (BASF); Sunfast® Carbazole Violet 23 (Sun Chemical 246-1670); LITHOL Fast Scarlet L4300 (BASF); Sunbrite Yellow 17 (Sun Chemical 275-0023); HELIOGEN Blue L6900, L7020 (BASF); Sunbrite Yellow 74 (Sun Chemical 272-0558); Spectra Pac® C Orange 16 (Sun Chemical 276-3016); HELIOGEN Blue K6902, K6910 (BASF); Sunfast® Magenta 122 (Sun Chemical 228-0013); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich); Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow D1 355, D1 351 (BASF); HOSTAPERM Pink E 02 (Clariant); Hansa Brilliant Yellow 5GX03 (Clariant); Permanent Yellow GRL 02 (Clariant); Permanent Rubino L6B 05 (Clariant); FANAL Pink D4830 (BASF); CINQUASIA Magenta (DU PONT); PALIOGEN Black L0084 (BASF); Pigment Black K801 (BASF); and carbon blacks such as REGAL® 330 (Cabot), Carbon Black 5250 (Columbia Chemical), Carbon Black 5750 (Columbia Chemical), mixtures thereof and the like.

The colorant is preferably included in the ink in an amount of from, for example, about 0% to about 15% by weight of the ink, preferably about 0.5% to about 6% by weight of the ink.

There are no particular restrictions regarding the aforementioned pigments. Any of the pigments commonly used in the field of printing, either organic or inorganic, may be employed. Examples of the pigments include carbon black, cadmium red, molybdenum red, chrome yellow, cadmium yellow, titan yellow, chromium oxide, viridian, titan cobalt green, ultramarine blue, Prussian blue, cobalt blue, azo pigments, phthalocyanine pigments, quinacridone pigments, isoindolinone pigments, dioxazine pigments, threne pigments, perylene pigments, perinone pigments, thioindigo pigments, quinophthalone pigments, metal complex pigments, and the like. These may be used individually or in combinations of two or more.

There are no particular restrictions regarding the aforementioned dyes. Examples of the dyes include azo dyes, diazo dyes, metal complex salt dyes, naphthol dyes, anthraquinone dyes, indigo dyes, carbonium dyes, quinoneimine dyes, cyanine dyes, quinoline dyes, nitro dyes, nitroso dyes, benzoquinone dyes, naphthoquinone dyes, xanthene dyes, phthalocyanine dyes, metal phthalocyanine dyes, and other oil-soluble dyes. These may be used individually or in combinations of two or more. They may also be used in conjunction with the pigments listed above.

It will also be appreciated that a colorant is not required in all embodiments. For example, the ink composition can be used as an overcoat material, such as to protect an underlying printed image. In these compositions, a colorant can be omitted in order to provide a clear and colorless composition.

Other additives. Embodiments of the phase change composition may be mixtures of curable components and, optionally, additional materials including reactive diluents, colorants, initiating agents, antioxidants (for example, those disclosed in U.S. Pat. No. 7,084,189), as well as any conventional optional additives. Such conventional additives may include, for example, defoamers, slip and leveling agents, pigment dispersants, etc. Embodiments of the phase change composition may also include additional monomeric or polymeric materials as desired Method for Making the Composition.

A method for making a phase change composition comprises adding crystalline polyester to a mixture comprising at least one acrylate monomer, and heating the mixture until the polyester melts into the monomer. In embodiments, the crystalline polyester is dissolved in a monomer, such as a diacrylate monomer, by heating the mixture to above the melting point of the polyester and stirring. The phase change composition becomes a homogenous mixture that gels upon cooling, on account of the crystallization of the polyester within the acrylate monomer. The crystalline polyester and the acrylate monomer can be, for example, aliphatic in nature and, thus, the phase change behavior can be reversible. Embodiments of this method can be performed in one step, that is there is no need to synthesize gellant materials before melting the crystalline polyester into the acrylate monomer because the components are commercially available.

In embodiments of the methods, the crystalline polyester is added in an amount of from about 3 wt % to about 20 wt %, such as from about 5 to about 15, such as from about 8 to about 12. The acrylate monomer is added in an amount of from about 80 to about 97, such as from about 85 to about 95, such as from about 88 to about 92.

Embodiments of the methods for making the phase change composition may additionally include mixing additives to the composition. The additives may be added in the same step as the polyester. The additives may include, for example, diluents, colorants, initiating agents, antioxidants (for example, those disclosed in U.S. Pat. No. 7,084,189), as well as any other conventional additives. Such conventional additives may include, for example, defoamers, slip and leveling agents, pigment dispersants, or monomeric or polymeric materials as desired.

In embodiments of the methods for making a phase change composition, a colorant may be added so that it becomes homogeneously distributed throughout the medium using, for example, magnetic stirring.

Method of Printing the Composition.

In embodiments, a method of printing the composition on a substrate comprises providing a substrate and applying a phase change composition to the substrate. The phase change composition may be applied, for example, at a temperature of about 140 to about 60, such as from about 120 to about 80, such as at a temperature of about 90° C. The phase change composition may include embodiments of the phase change composition disclosed above, wherein the phase change composition comprises a crystalline polyester and at least one monomer. Upon application to the substrate, the phase change composition undergoes a phase change from a liquid to a gel and pins to the surface of the substrate. The phase change can be reversible. Additionally, embodiments of the methods of printing on a substrate may include, for example, a curing step, wherein the phase change composition is cured and the phase change is no longer reversible.

EXAMPLES

Example 1

Example 1 describes a phase change composition formed from crystalline polyester and di-acrylate monomer. 0.12 g (10 wt %) of a crystalline polyester (copoly(2,2-dimethylpropane-1,3-diol-decanoate)-copoly(nonylene-decanoate from Kao Corporation) was added to 1.08 g of a di-acrylate monomer (SR9003 from Sartomer). The mixture was then heated to a temperature of about 90 deg. C. until the polyester melted into the monomer, creating an embodiment of the phase change composition. The components were mixed at this temperature with a stir bar for an hour. Upon cooling to a temperature of 30° C., the composition underwent a phase change to a gel. Upon reheating to the initial heating temperature of 90° C., the composition returned to a liquid with low viscosity. As a liquid, the phase change composition of Example 1 was siphoned by pipette and dropped on a vertical metal surface, which is maintained at room temperature (20° C.) where droplets immediately gelled upon cooling and pinned to the metal surface.

Example 2

Example 2 describes a curable phase change composition formed from a synthesized photoinitiator-polyester and a di-acrylate monomer. The photoinitiator-polyester was produced according to U.S. patent application Ser. No. 12/629,583). 0.107 grams of the washed photoinitiator-polyester and 0.933 grams of a di-acrylate monomer (SR9003 from Sartomer) were added to a 4 dram vial. The mixture was then heated to a temperature of about 90° C. until the polyester melted into the acrylate monomer, creating an embodiment of the phase change composition. The components were mixed with shaking for one minute. Upon cooling to a temperature of 30° C., a phase change occurred and the composition turns into a gel.

Then 2 grams of Example 2 were heated to a temperature of 90° C. and added to a pan heated with a heat gun to a temperature of 90° C. The pan containing the composition was then passed under a UV lamp three times. After the first pass under the UV lamp the composition cured into a clear solid film. The cured film in the experimental pan remained clear after cooling, indicating that the polyester was cured into the acrylate base and incapable of reforming crystalline domains. The film recovered from the experimental pan was soxhlet extracted in toluene for 60 hours. Analysis of the film mass prior to and after extraction indicated that the film was 100% gel.

Rheological measurements were performed to observe the phase change behavior of Example 2. The rheological measurements were performed on a RFS3 Fluids Rheometer in its dynamic mode, using a 25 mm parallel plate and a gap of 500 microns. The test performed was a Temperature step sweep between 80° C. and 25° C. at a constant frequency of 1 Hz and temperature steps of 5° C. increments with an equilibration time of 180 seconds at each temperature. It was observed that the composition underwent a phase change from a low viscosity (about 10 cp) to a high viscosity (about $10^4$ cp) at a temperature of approximately 30 to 40° C. That is, the system gels at a temperature of about 40° C.

Example 3

Example 3 is an embodiment of the phase change composition that was prepared from crystalline polyester, SR9003, and a cyan pigment dispersion. 16 grams (10 wt %) of FXCPE were added to 165 grams of SR9003. 10 grams of a mixture of pigment and SR9003 (15 wt % of pigment) were also added. The mixture was heated to a temperature of 90° C. so that the polyester melted into the acrylate monomer. Magnetic stirring was used to homogenously distribute the pigment throughout the composition. Upon cooling to a temperature of 30° C., Example 3 underwent a phase change to a gel. Upon reheating to a temperature of 90° C., Example 3 returned to a liquid with low viscosity. This cycle was repeated 4 times and each time a gel was formed upon cooling, this shows the reversibility of the gelling system.

The composition of Example 3 was heated to a temperature of 90° C. and poured into the ink tank of a Xerox Phaser 860 printer. The machine printed an image on Xerox dura paper. The composition in Example 3 prints effectively leaving well defined marks directly on the paper substrates.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A phase change composition comprising:
   at least one crystalline polyester; and
   at least one acrylate monomer,
   wherein the crystalline polyester is melted into the acrylate monomer, and
   the composition is in a gel state at a temperature of about 10° C. to about 40° C.

2. The composition of claim 1, wherein the crystalline polyester is present in an amount of from about 3 percent by weight to about 20 percent by weight.

3. The composition of claim 1, wherein the monomer is present in an amount of from about 80 percent by weight to about 97 percent by weight.

4. The composition of claim 1, wherein the crystalline material is selected from the group consisting of aliphatic crystalline polyesters, polylactones, and mixtures thereof.

5. The composition of claim 4, wherein the crystalline polyester is an aliphatic crystalline polyester formed by reacting one compound selected from the group consisting of 1,2-ethanediol, 1,3-propanediol, 1,4-butanediol, 1,5-pentanediol, 2,2-dimethylpropane-1,3-diol, 1,6-hexanediol, 1,7-heptanediol, 1,8-octanediol, 1,9-nonanediol, 1,10-decanediol, and 1,12-dodecanediol.

6. The composition of claim 4, wherein the crystalline polyester is a polylactone selected from the group consisting of poly(pentadecalactone), poly(pentadecenlactone), poly(hexadecenlactone), poly(hexadecen-7-olide), polycaprolactone, polydodecalactone, poly(pentadecalactone) co-pentadecenlactone, poly(pentadecalactone) co-hexadecenlactone, and mixtures thereof.

7. The composition of claim 1, wherein the monomer is present in an amount of from about 10 percent by weight to about 80 percent by weight.

8. The composition of claim 1, wherein the monomer is selected from the group consisting of propoxylated neopentyl glycol diacrylate, diethylene glycol diacrylate, triethylene glycol diacrylate, hexanediol diacrylate, dipropyleneglycol diacrylate, tripropylene glycol diacrylate, alkoxylated neopentyl glycol diacrylate, isodecyl acrylate, tridecyl acrylate, isobornyl acrylate, propoxylated trimethylolpropane triacrylate, ethoxylated trimethylolpropane triacrylate, di-trimethylolpropane tetraacrylate, dipentaerythritol pentaacrylate, ethoxylated pentaerythritol tetraacrylate, propoxylated glycerol triacrylate, isobornyl methacrylate, lauryl acrylate, lauryl methacrylate, neopentyl glycol propoxylate methylether monoacrylate, isodecylmethacrylate, caprolactone acrylate, 2-phenoxyethyl acrylate, isooctylacrylate, isooctylmethacrylate, and butyl acrylate.

9. The composition of claim 1, wherein the composition additionally comprises at least one additive selected from the group consisting of a photoinitiator, a stabilizer, and a colorant.

10. The composition of claim 1, wherein a viscosity of the composition undergoes a change from a viscosity of about 5 cps to about 30 cps at 80° C. to a viscosity of about $10^4$ cps to about $10^6$ cps at a temperature of about 30° C.

11. The composition of claim 10, wherein the change in viscosity is reversible.

12. A method of making a phase change composition, the method comprising:
adding at least one crystalline polyester to a mixture comprising at least one acrylate monomer; and
heating the mixture until the polyester melts into the acrylate monomer,
wherein the composition is in a gel state at a temperature of about 10° C. to about 40° C.

13. The method of claim 12, wherein at least one additive selected from the group consisting of a photoinitiator, a stabilizer and a colorant is added to the mixture before heating.

14. The method of claim 12, wherein the polyester is selected from the group consisting of aliphatic crystalline polyesters and polylactones.

15. The method of claim 12, wherein the polyester crystallizes within the acrylate monomer.

16. The method of claim 12, wherein the acrylate monomer is present in the mixture in an amount of from about 80 percent to about 97 percent by weight of the composition.

17. The method of claim 12, wherein the polyester is added in an amount of from about 3 percent to about 20 percent by weight of the composition.

18. The method of claim 12, wherein the polyester is melted by heating prior to being added to the acrylate monomer.

19. The method of claim 14, wherein the polyester is a polylactone selected from the group consisting of poly(pentadecalactone), poly(pentadecenlactone), poly(hexadecenlactone), poly(hexadecen-7-olide), polycaprolactone, polydodecalactone, poly(pentadecalactone) co-pentadecenlactone, poly(pentadecalactone) co-hexadecenlactone, and mixtures thereof.

20. A method of printing on a substrate, the method comprising:
providing a substrate; and
applying a phase change composition to the substrate by jetting at a temperature of at least 40° C.,
wherein
the phase change composition comprises at least one crystalline polyester and at least one acrylate monomer,
the crystalline polyester is melted into the acrylate monomer, and
the phase change composition is in a gel state at a temperature of about 10° C. to about 40° C.

* * * * *